(12) United States Patent
Lin et al.

(10) Patent No.: US 9,841,789 B2
(45) Date of Patent: Dec. 12, 2017

(54) HINGE ASSEMBLY FOR ELECTRONIC DEVICE

(71) Applicant: ASUSTeK COMPUTER INC., Taipei (TW)

(72) Inventors: Yu-Kang Lin, Taipei (TW);
Yen-Chung Chen, Taipei (TW);
Chung-Chieh Huang, Taipei (TW);
Chien-Hsun Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 15/452,876

(22) Filed: Mar. 8, 2017

(65) Prior Publication Data

US 2017/0269637 A1 Sep. 21, 2017

(30) Foreign Application Priority Data

Mar. 15, 2016 (TW) .............................. 105203547 U

(51) Int. Cl.
| | |
|---|---|
| *G06F 1/16* | (2006.01) |
| *H04M 1/00* | (2006.01) |
| *E05D 7/00* | (2006.01) |
| *E05D 3/12* | (2006.01) |
| *F16C 11/04* | (2006.01) |

(52) U.S. Cl.
CPC ............. *G06F 1/1681* (2013.01); *E05D 3/12* (2013.01); *E05D 7/00* (2013.01); *F16C 11/04* (2013.01); *G06F 1/1613* (2013.01); *G06F 1/1615* (2013.01); *E05Y 2900/606* (2013.01); *G06F 1/1626* (2013.01)

(58) Field of Classification Search
CPC .... G06F 1/1681; G06F 1/1613; G06F 1/1615; G06F 1/1624

USPC ............ 361/679.55; 455/575.1, 575.3, 575.4
See application file for complete search history.

(56) References Cited

U.S. PATENT DOCUMENTS

| | | | |
|---|---|---|---|
| 5,268,817 A | 12/1993 | Miyagawa et al. | |
| 9,317,071 B2* | 4/2016 | Fan | G06F 1/1681 |
| 9,366,064 B1* | 6/2016 | Chen | E05D 3/12 |

(Continued)

FOREIGN PATENT DOCUMENTS

| | | |
|---|---|---|
| CN | 201927650 | 8/2011 |
| CN | 202441712 | 9/2012 |

(Continued)

OTHER PUBLICATIONS

Search report issued in corresponding EP patent application dated Jul. 28, 2017.

(Continued)

*Primary Examiner* — Nidhi Thaker
(74) *Attorney, Agent, or Firm* — McClure, Qualey & Rodack, LLP

(57) ABSTRACT

A hinge assembly adapted to an electronic device is provided. The hinge assembly comprises a fixing member, a sliding shaft, a connecting member, a rotating shaft and a rotating member. A curved guide rail is formed at the side plate. When the sliding shaft is located at a first position and a force applies on the rotating member, the sliding shaft moves from the first position to a second position along the curved guide rail, when the sliding shaft is located at the second position of the curved guide rail and the force applies on the rotating member continuously, the rotating member rotates around the rotating shaft.

9 Claims, 13 Drawing Sheets

(56) References Cited

U.S. PATENT DOCUMENTS

| | | | |
|---|---|---|---|
| 9,404,298 B1* | 8/2016 | Chen .................... | G06F 1/1681 |
| 2011/0304983 A1* | 12/2011 | Senatori ............... | G06F 1/1616 |
| | | | 361/679.55 |
| 2014/0168878 A1* | 6/2014 | Jheng ................... | G06F 1/1681 |
| | | | 361/679.27 |
| 2017/0208703 A1* | 7/2017 | Lin ....................... | E05F 1/1016 |
| 2017/0257961 A1* | 9/2017 | Chen .................... | H05K 5/0226 |

FOREIGN PATENT DOCUMENTS

| | | |
|---|---|---|
| JP | H0235214 U | 3/1990 |
| JP | 2005327918 A | 11/2005 |
| JP | 2009071511 A | 4/2009 |

OTHER PUBLICATIONS

Office Action issued in corresponding Japan patent application dated Jun. 20, 2017.

\* cited by examiner

HINGE ASSEMBLY FOR ELECTRONIC DEVICE

CROSS-REFERENCE TO RELATED APPLICATION

This application claims the priority benefit of TW application serial No. 105203547, filed on Mar. 15, 2016. The entirety of the above-mentioned patent application is hereby incorporated by references herein and made a part of specification.

BACKGROUND OF THE INVENTION

Field of the Invention

The invention relates to a hinge assembly and, more specifically, to a hinge assembly adapted to an electronic device.

Description of the Related Art

Smart phones and tablet computers are popular portable electronic devices and gradually replace notebooks and DVD players due to their portability and powerful functionality. A support is usually used to stand the smart phone or the tablet computer on a desk for a user to read articles or watch audio-visual programs or videos.

A support is separately installed to an electronic device or is formed by folding a protecting cover. Generally, the protective cover is made of leathern or plastic with poor rigidity, and the support is usually made of paper or plastic sheet configured inside the protective cover. However, such the support has a short service life due to its lower mechanical strength. The support separately installed to the electronic device may have a higher mechanical strength but not portable easily. The support is usually connected to a casing of the electronic device via a pivot structure. However, the rotatable angle of the support relative to the electronic device may be restricted by the pivotal connection due to a physical design of light, thin and short. Moreover, to facilitate the assembly of the support thereto, the pivot structure is usually exposed out of the casing, which may affect the consistency of the appearance. Since the above pivot structure is easily damaged or falls off under external impact, the stability and service life of the pivotal connection is reduced.

BRIEF SUMMARY OF THE INVENTION

According to one aspect of the disclosure, a hinge assembly adapted to an electronic device is provided. The hinge assembly comprises: a fixing member fixed to a casing of the electronic device and including a side plate and two fixing plates; a sliding shaft slidably configured to the curved guide rail of the side plate; a connecting member; a rotating shaft fixed to a back plate of the electronic device and passing through the other end of the connecting member; and a rotating member. One end of the connecting member passes through the sliding shaft. The rotating shaft passes through the rotating member. The two fixing plates extend along a direction from two end portions of the side plate, respectively. A curved guide rail is configured at the side plate. When the sliding shaft is located at a first position and a force applies on the rotating member, the sliding shaft moves from the first position to a second position along the curved guide rail. When the sliding shaft is located at the second position of the curved guide rail and the force applies on the rotating member continuously, the rotating member rotates around the rotating shaft.

According to one aspect of the disclosure, an electronic device comprises a casing, a back plate, and a hinge assembly is provided. The hinge assembly comprises: a fixing member fixed to the casing and including a side plate and two fixing plates; a sliding shaft slidably configured to the curved guide rail of the side plate; a connecting member; a rotating shaft fixed to the back plate and passing through the other end of the connecting member; and a rotating member. One end of the connecting member passes through the sliding shaft. The rotating shaft passes through the rotating member. The two fixing plates extend along a direction from two end portions of the side plate, respectively. A curved guide rail is configured at the side plate. When the sliding shaft is located at a first position and a force applies on the rotating member, the sliding shaft moves from the first position to a second position along the curved guide rail. When the sliding shaft is located at the second position of the curved guide rail and the force applies on the rotating member continuously, the rotating member rotates around the rotating shaft.

In sum, in embodiments, the hinge assembly is assembled to the casing and the back plate of the electronic device to enable the back plate to rotate relative to the casing, and thus the back plate serves as a support to support the electronic device. Additionally, the hinge assembly is configured inside the casing to prevent the external impact, and therefore the service life of the hinge assembly is prolonged and the hinge assembly rotates by a large angle via the two-stage rotation.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
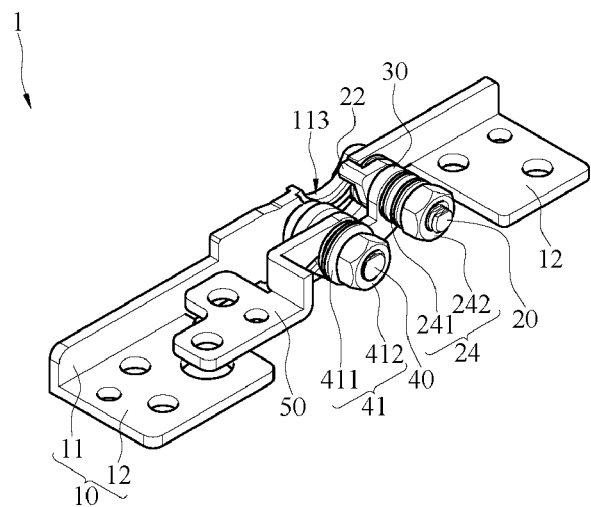
FIG. 1 is a schematic diagram showing a hinge assembly in an embodiment.
Figure 2:
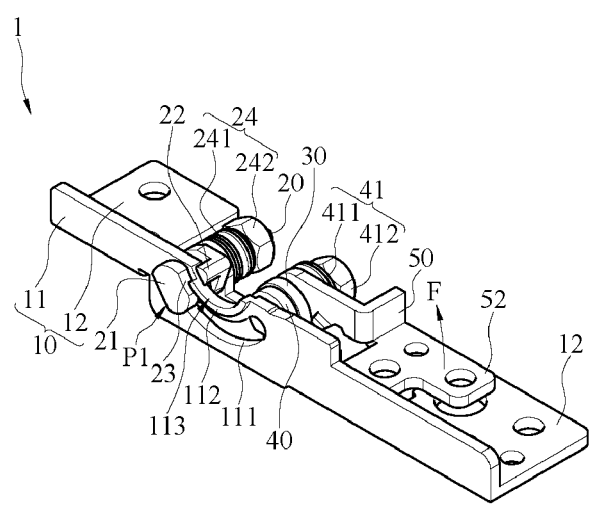
FIG. 2 is a schematic diagram showing the hinge assembly in FIG. 1 viewed from a different angle.
Figure 3:
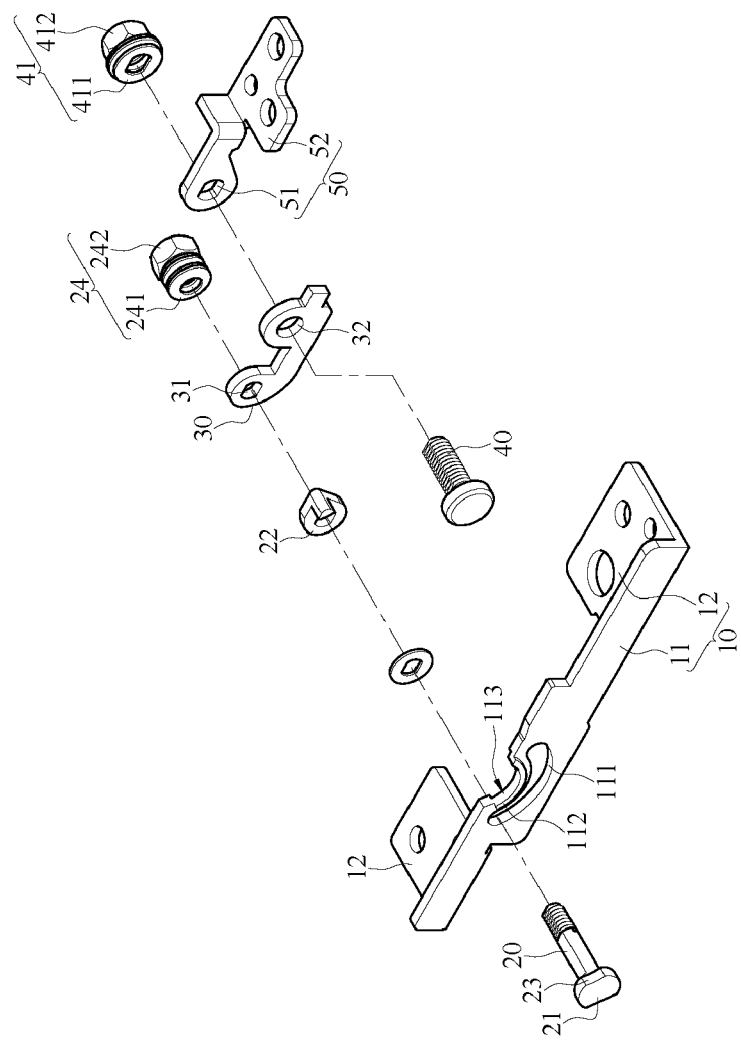
FIG. 3 is an exploded view of the hinge assembly in FIG. 1.

Please refer to FIG. 1 to FIG. 3. FIG. 1 is a schematic diagram showing a hinge assembly in a first embodiment. FIG. 2 is a schematic diagram showing the hinge assembly in FIG. 1 viewed from a different angle. FIG. 3 is an exploded view of the hinge assembly in FIG. 1. As shown in FIG. 1 to FIG. 3, in the first embodiment, a hinge assembly 1 includes a fixing member 10, a sliding shaft 20, a connecting member 30, a rotating shaft 40 and a rotating member 50. The fixing member 10 includes a side plate 11 and two fixing plates 12. The two fixing plates 12 extend from two end portions of the side plate 11 along a direction, respectively. In the embodiment, the two fixing plates 12 are parallel to each other and are perpendicular to the side plate 11, which is not limited herein. The side plate 11 includes a curved guide rail 111 formed through the side plate 11. In the embodiment, the rotating member 50 rotates about a virtual axis, and the virtual axis is the center of the curved guide rail 111.

The sliding shaft 20 passes through the curved guide rail 111 and is slidable within the curved guide rail 111 of the side plate 11. In the embodiment, the sliding shaft 20 includes an end portion 21, and the size of the end portion 21 along the width direction of the curved guide rail 111 is larger than the width of the curved guide rail 111. Thus, the sliding shaft 20 is restricted and slidable within the curved guide rail 111. To avoid the deviation of the sliding shaft 20 when the sliding shaft 20 moves along the curved guide rail 111, the side plate 11 further includes a guiding member 112 and a recess 113. The sliding shaft 20 further includes a positioning member 22 and a guiding recess 23 recessed at a periphery of the end portion 21. In an embodiment, the positioning member 22 is an individual component which is fixed to and sleeved on the sliding shaft 20. In another embodiment, the positioning member 22 and the sliding shaft 20 are formed in one piece, which is not limited herein.

As shown in FIG. 1 and FIG. 2, the guiding recess 23 at the end portion 21 of the sliding shaft 20 correspondingly abuts against the guiding member 112 of the side plate 11. Thus the sliding shaft 20 slides with the positioning by the guiding recess 23 and the guiding member 112. In the embodiment, the guiding member 112 is a curved flange extending outwards from the side plate 11. The shape of the curved flange corresponds to that of the curved guide rail 111. In an embodiment, the shape of the guiding recess 23 of the end portion 21 of the sliding shaft 20 also corresponds to that of the guiding member 112 to allow the guiding recess 23 to abut against the guiding member 112 and move smoothly along the guiding member 112.

As shown in FIG. 1 and FIG. 2, when the positioning member 22 is sleeved on the sliding shaft 20, the positioning member 22 is received in the recess 113 of the side plate 11. The shape of the recess 113 corresponds to that of the curved guide rail 111. Therefore, when the sliding shaft 20 slides along the curved guide rail 111, the positioning member 22 also slides along the recess 113. Thus, with the configuration of the positioning member 22, the sliding shaft 20 slides exactly along the curved guide rail 111 without any deviation.

Please refer to FIG. 1 to FIG. 3, the connecting member 30 is a long plate member. In the embodiment, the connecting member 30 includes a first through hole 31 and a second through hole 32 at two end portions of the connecting member 30, respectively. The sliding shaft 20 passes through the first through hole 31 of the connecting member 30, and the rotating shaft 40 passes through the second through hole 32 of the connecting member 30. The rotating member 50 includes a third through hole 51 and an assembling portion 52. The rotating shaft 40 passes through the rotating member 50 via the third through hole 51. In an embodiment, the hinge assembly 1 is also used to be connected to other components except for the fixing plate 12, via the assembling portion 52.

In the embodiment, when a force drives the rotating member 50 to move, the rotating member 50 has a first travel with the movement of the sliding shaft 20 along the curved guide rail 111, then, the rotating member 50 rotates to have a second travel via the rotating shaft 40. In the embodiment, the sliding shaft 20 further includes a first torsion device 24. The rotating shaft 40 includes a second torsion device 41. The first torsion device 24 includes three elastic sheets 241 and a nut 242. The second torsion device 41 includes two elastic sheets 411 and a nut 412. In the embodiment, the number of the elastic sheets and nuts are exemplified only for description. In other embodiments, the number of the elastic sheets and nuts are changed according to the practice requirements, which is not limited herein.

The first torsion device 24 is configured at and fixed to an end portion of the sliding shaft 20 opposite to the end portion 21. The torsion force from the first torsion device 24 is changed by adjusting the fastening of the nut 242. Similarly, the second torsion device 41 is configured at and fixed to an end of the rotating shaft 40, and the torsion force from the second torsion device 41 is changed by adjusting the fastening of the nut 412. Therefore, to make the sliding shaft 20 move before the rotating shaft 40 rotates, the torsion force from the first torsion device 24 is less than that from the second torsion device 41. In such a way, when a force drives the rotating member 50 to move, the sliding shaft 20 moves (the first travel) first with the above small torsion force. When the sliding shaft 20 moves to the end and the force applies continuously on the rotating member 50, the rotating member 50 then rotates (the second travel) via the rotating shaft 40.

Figure 4:
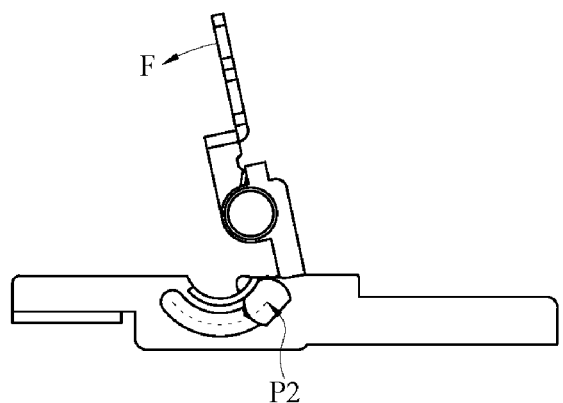
FIG. 4 is a schematic diagram showing an operation of the hinge assembly in FIG. 1 in a first state.
Figure 5:
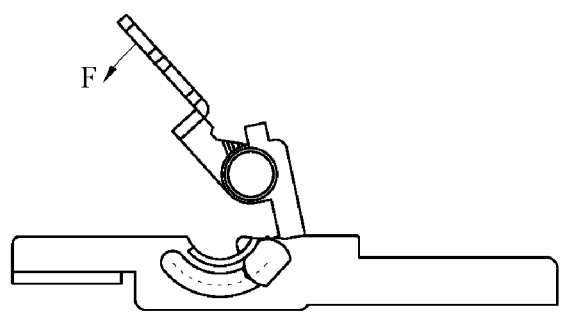
FIG. 5 is a schematic diagram showing an operation of the hinge assembly in FIG. 1 in a second state.

Please refer to FIG. 1 to FIG. 5. FIG. 4 is a schematic diagram showing an operation of the hinge assembly in FIG. 1 in a first state. FIG. 5 is a schematic diagram showing an operation of the hinge assembly in FIG. 1 in a second state. As shown in FIG. 2, when the sliding shaft is at a first position P1 and a force F applies on the rotating member 50, since the torsion force from the first torsion device 24 is less than that from the second torsion device 41, the sliding shaft 20 moves from the first position P1 to a second position P2 (the position shown in FIG. 4) along the curved guide rail 111. Then, when the sliding shaft 20 reaches the second position P2 at an end of the curved guide rail 111 and does not move further. And the force F applies continuously on the rotating member 50, the rotating member 50 rotates about the rotating shaft 40 (as shown in FIG. 5).

In the embodiment, the hinge assembly 1 is assembled to the casing and the back plate of the electronic device, the rotating member 50 is assembled to the back plate and the fixing member 10 is fixed to the casing. In an embodiment, the back plate rotates to a desired angle relative to the casing via the hinge assembly 1 to serve as a support for the electronic device. In an embodiment, the back plate is fully opened to facilitate the replacement or repair of the components inside the casing. In the embodiment, the hinge assembly 1 is assembled inside the casing instead of being exposed. As a result, the hinge assembly 1 is not easily damaged under external impacts. Thus, the serve life of the hinge assembly 1 is prolonged. Additionally, the hinge assembly 1 rotate by a larger rotatable angle via the two-stage rotation.

Figure 6:
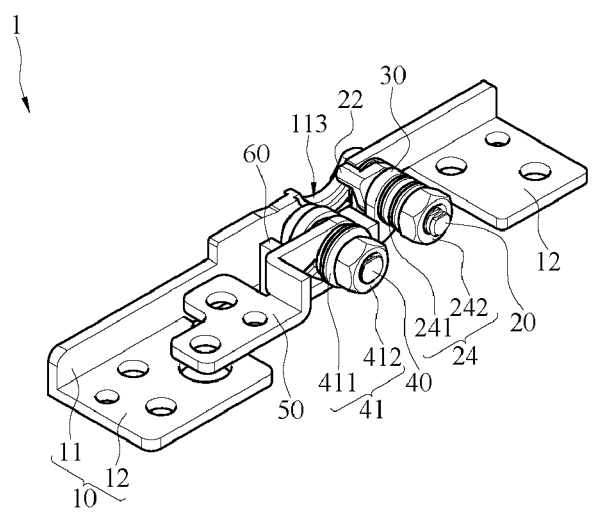
FIG. 6 is a schematic diagram showing a hinge assembly in an embodiment.
Figure 7:
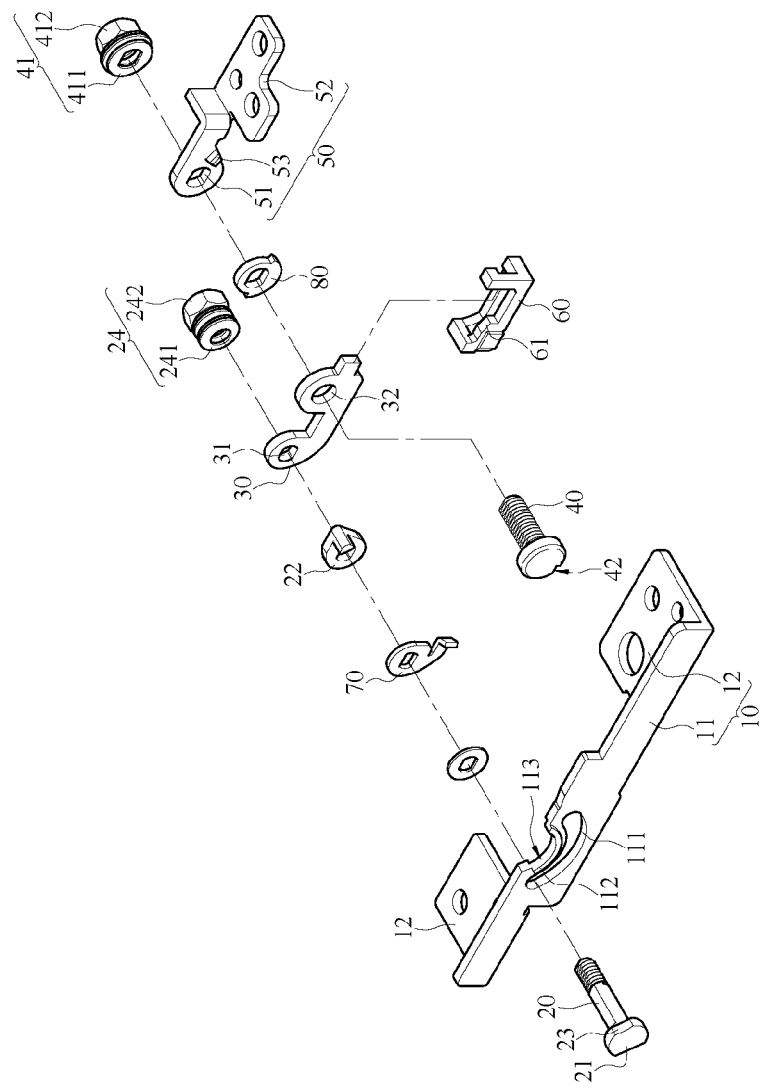
FIG. 7 is an exploded view of the hinge assembly in FIG. 6.

Please refer to FIG. 6 to FIG. 7. FIG. 6 is a schematic diagram showing a hinge assembly in a second embodiment, and FIG. 7 is an exploded view of the hinge assembly in FIG. 6. In the embodiment, the component same/similar to that in the previous embodiment is denoted by the same symbol, and the description for the same component/structure is omitted hereinafter. In the second embodiment, the hinge assembly 1 further includes a stopping member 80 which is sleeved on the rotating shaft 40 and adjacent to the rotating member 50. The rotating member 50 includes a protrusion 53 adjacent to the third through hole 51. The protrusion 53 selectively abuts against the stopping member 80. When the rotating member 50 rotates back to an original position from a position shown in FIG. 5, the rotating member 50 rotates about the rotating shaft 40 until the protrusion 53 abuts against the stopping member 80, that is, the rotating member 50 stops rotating about the rotating shaft 40 and then drives the sliding shaft 20 to move from the second position P2 toward the first position P1.

In the embodiment, the hinge assembly 1 further includes a sliding member 60 and a stopping sheet 70. The sliding member 60 is slidably configured on the connecting member 30, and the stopping sheet 70 is configured to allow the sliding shaft 20 to pass through. The stopping sheet 70 selectively abuts against or not against the sliding member 60. When the sliding shaft 20 is located at the first position P1, the stopping sheet 70 is pushed by the side plate 11 of the fixing member 10 to be compressed toward the connecting member 30. At the time, the stopping sheet 70 abuts against the sliding member 60 to keep the sliding member 60 fixed.

Figure 8:
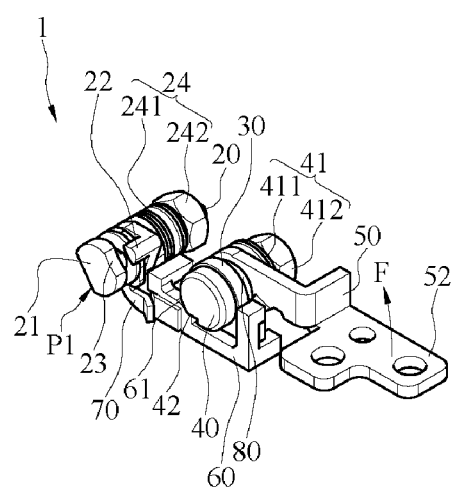
FIG. 8 is a schematic diagram showing the hinge assembly in FIG. 6, in which a fixing member is not shown in an embodiment.

FIG. 8 is a schematic diagram showing the hinge assembly in FIG. 6 with a fixing member not shown in a second embodiment. Please refer to FIG. 6 and FIG. 8, when the rotating member 50 is located parallel to the fixing member 10 (that is, the sliding shaft 20 is located at the first position P1 as shown in FIG. 2) before a force applies on the rotating member 50, the stopping sheet 70 is pushed by the side plate 11 to be compressed toward the connecting member 30. At the time, the stopping sheet 70 abuts against the sliding member 60 to fix the sliding member 60.

Please refer to FIG. 8, in the embodiment, the sliding member 60 includes a positioning protrusion 61. The positioning recess 42 is formed at an end of the rotating shaft 40. When the stopping sheet 70 abuts against the sliding member 60 to fix the sliding member 60, the positioning protrusion 61 is restricted at the positioning recess 42 to stop the rotation of the rotating shaft 40. Before the sliding shaft 20 slides to the second position P2 of the curved guide rail 111, the stopping sheet 70 is pushed by the side plate 11 and abuts against the sliding member 60. That is, before the sliding shaft 20 slides to the second position P2, the rotating shaft 40 does not rotate due to the sliding member 60. As a result, the rotating shaft 40 does not rotate before the movement of the sliding shaft 20 is finished. In such a way, the rotating member 50 moves for the first travel with the movement of the sliding shaft 20, and then rotates about the rotating shaft 40 for the second travel. With such a configuration, even when the difference of the torsion forces provided by the first torsion device 24 and the second torsion device 41 is not sufficient, the rotating member 50 would not rotate about the rotating shaft 40 first.

Figure 9:
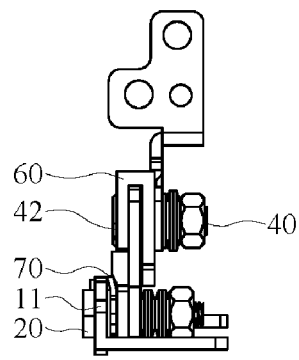
FIG. 9 is a schematic diagram showing an operation of the hinge assembly in FIG. 6 in a first state in an embodiment.
Figure 10:
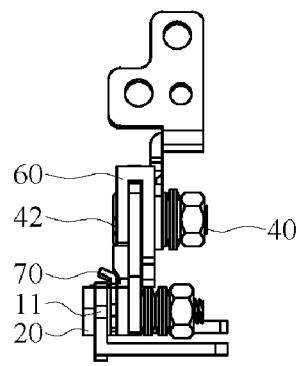
FIG. 10 is a schematic diagram showing an operation of the hinge assembly in FIG. 6 in a second state in an embodiment.
Figure 11:
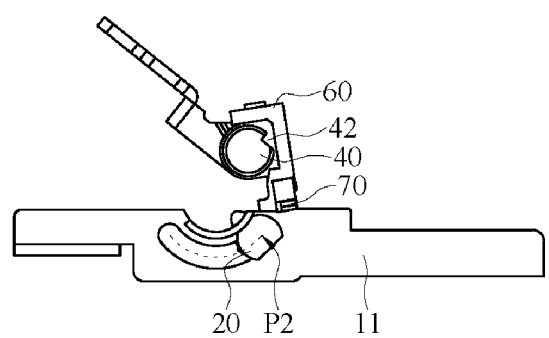
FIG. 11 is a schematic diagram showing an operation of the hinge assembly in FIG. 6 in a third state in an embodiment.

Please refer to FIG. 9 to FIG. 11, FIG. 9 to FIG. 11 are schematic diagrams showing operations of the hinge assembly in FIG. 6 in a first, second and third state, in a second embodiment. FIG. 9 shows an operation of the hinge assembly in the first state in a second embodiment. In FIG. 9, the sliding shaft 20 does not fully reach to the second position P2 yet, and the stopping sheet 70 is pushed by the side plate 11 to abut against the sliding member 60. FIG. 10 shows an operation of the hinge assembly in the second state in an embodiment. In FIG. 10, the sliding shaft 20 already reaches the second position P2 (the position shown in FIG. 4), and the stopping sheet 70 is free from the push of the side plate 11. The stopping sheet 70 returns to an uncompressed state toward the side plate 11 via an elastic energy and does not abut against the sliding member 60. Thus, the sliding member 60 moves down (along a direction of gravity, that is, the direction toward the bottom of the FIG. 10) by gravity. Since the sliding member 60 slides downwardly, the positioning protrusion 61 of the sliding member 60 disengages from the positioning recess 42, and then the rotating shaft 40 is capable of rotating (as shown in FIG. 11).

Please refer to FIG. 12 to FIG. 16, FIG. 12 to FIG. 16 are schematic diagrams showing operations of an electronic device in a fourth state to eighth state in a second embodiment, respectively. In one embodiment, the hinge assembly in FIG. 6 (the second embodiment) is taken as an example for description. The hinge assembly in FIG. 1 (the first embodiment) also can be assembled to achieve the same technical effect in another embodiment. In the embodiment, the hinge assembly 1 is configured inside the electronic device 100. The electronic device 100 includes a casing 101 and a back plate 102. The hinge assembly 1 is fixed to the casing 101 via the two fixing plates 12 of the fixing member 10, and the assembling portion 52 of the rotating member 50 of the hinge assembly 1 is fixed to the back plate 102. For clarity, FIG. 12 to FIG. 16 are presented in a perspective view or in a section view.

Figure 12:
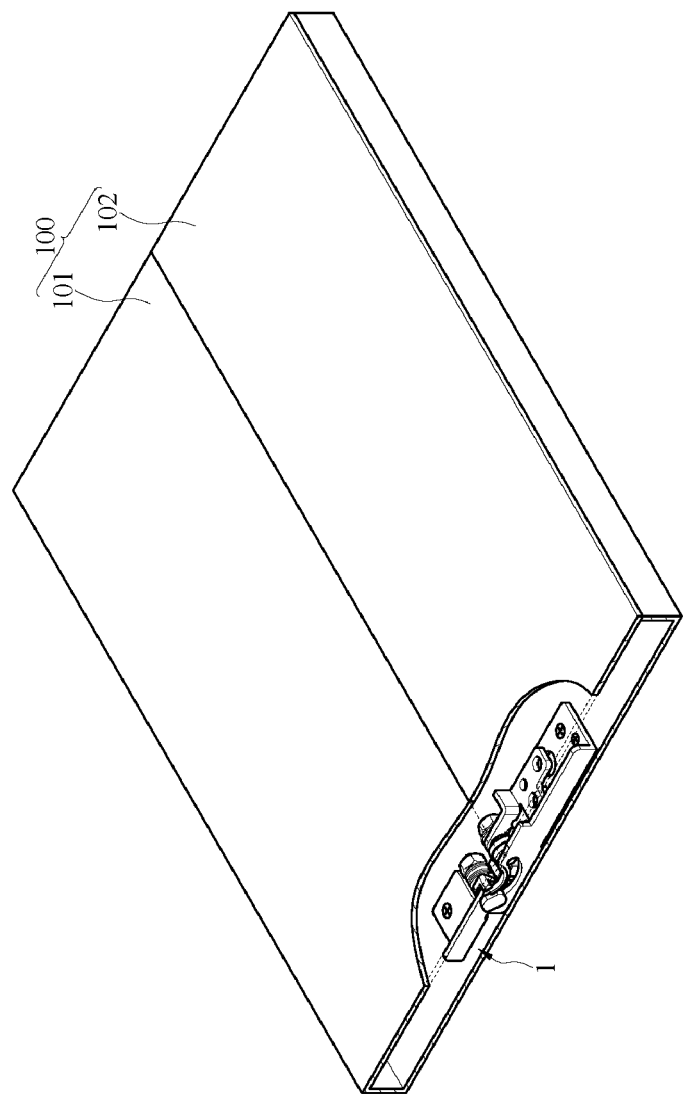
FIG. 12 is a schematic diagram showing an operation of an electronic device in FIG. 6 in a fourth state in an embodiment.
Figure 13:
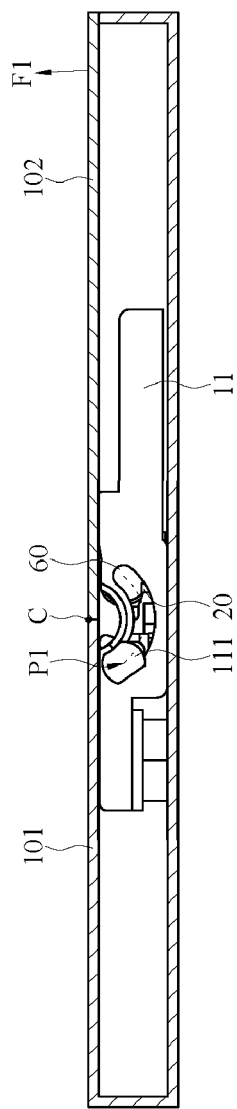
FIG. 13 is a schematic diagram showing an operation of an operation of the electronic device in FIG. 6 in a fifth state in an embodiment.
Figure 14:
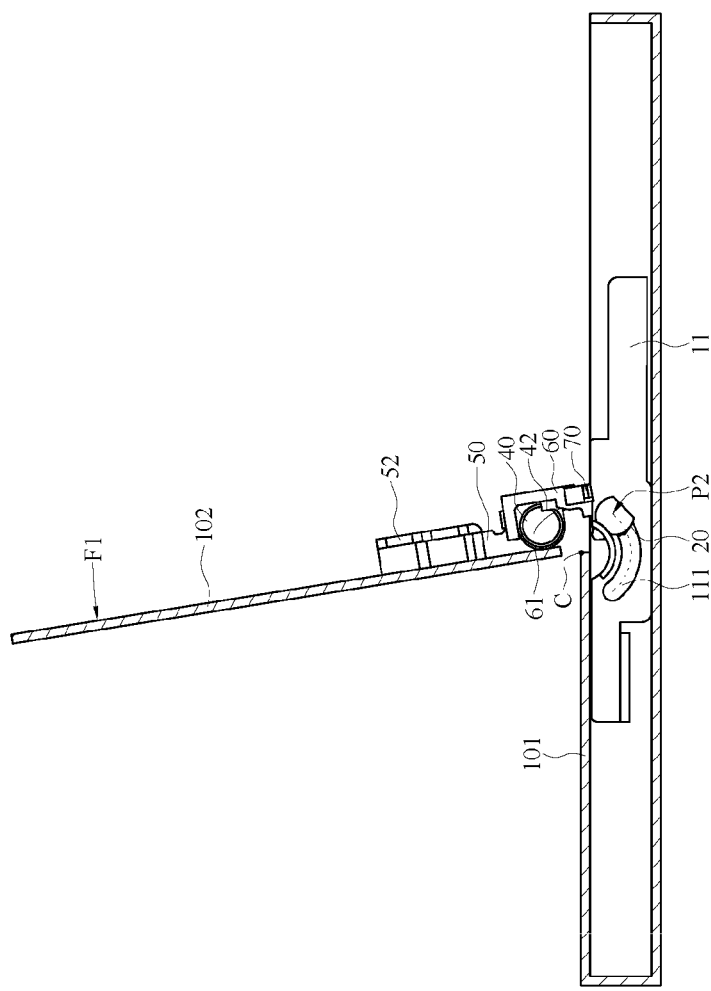
FIG. 14 is a schematic diagram showing an operation of an operation of the electronic device in FIG. 6 in a sixth state in an embodiment.

As shown in FIG. 12, the hinge assembly 1 is configured inside the electronic device 100 instead of being exposed outside, and thus the hinge assembly 1 is not easily damaged due to external impacts, and the serve life of the hinge assembly 1 is prolonged. Please refer to FIG. 13, the curved guide rail 111 is formed around a virtual axis C which is at the junction of the casing 101 and back plate 102. When the back plate 102 is closed, the sliding shaft 20 is located at the first position P1 of the curved guide rail 111. Then, when the force F1 applies on the back plate 102, the rotating member 50 is driven to rotate. The sliding shaft 20 moves along the curved guide rail 111 with the torsion force and the locking between the sliding member 60 and the stopping sheet 70. As shown in FIG. 14, since the curved guide rail 111 is a curved guide rail formed about a center of the virtual axis C, when the sliding shaft 20 moves along the curved guide rail 111, the back plate 102 rotates about the virtual axis C.

In the embodiment, when the sliding shaft 20 moves to the second position P2 of the curved guide rail 111, the stopping sheet 70 disengages from the side plate 11 and is not pushed by the side plate 11. The stopping sheet 70 returns to the uncompressed state toward the side plate 11 via the elastic energy and does not abut against the sliding member 60.

Figure 15:
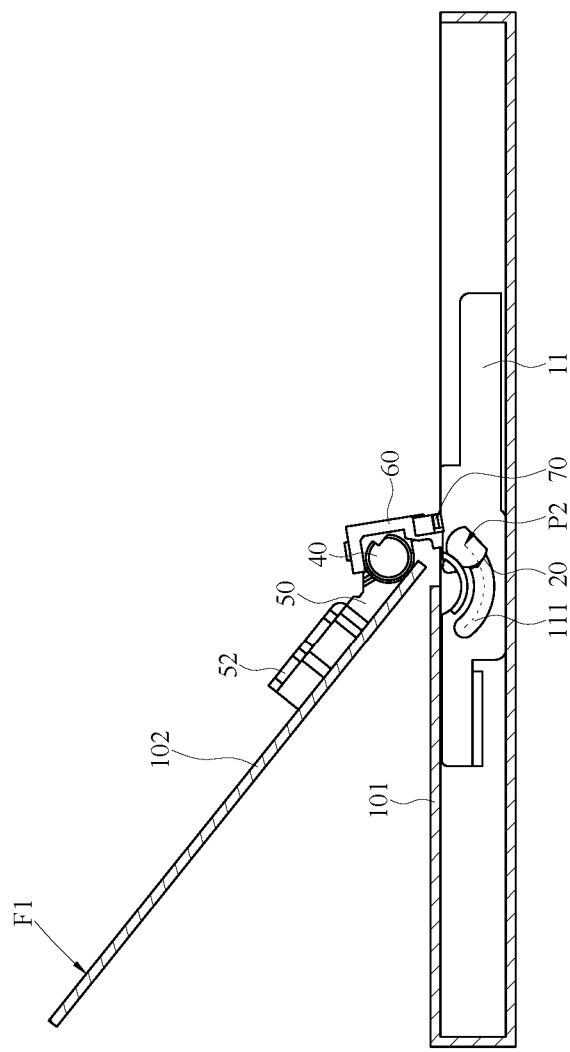
FIG. 15 is a schematic diagram showing an operation of an operation of the electronic device in FIG. 6 in a seventh state in an embodiment.
Figure 16:
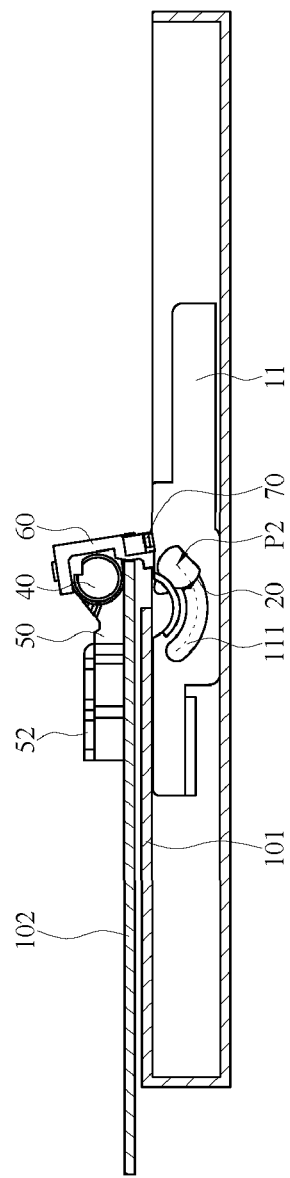
FIG. 16 is a schematic diagram showing an operation of an operation of the electronic device in FIG. 6 in an eighth state in an embodiment.

Then, the sliding member 60 moves downwardly by the gravity to make the positioning protrusion 61 of the sliding member 60 disengage from the positioning recess 42. At the time, when the force applies on the back plate 102 continuously, the back plate 102 is driven to rotate about the rotating shaft 40 (as shown in FIG. 15) until the back plate 102 rotates by 180 degrees to be parallel to the casing 101 (as shown in FIG. 16).

In sum, with the hinge assembly in embodiments, the back plate rotates by a large angle (from 0 degree to 180 degrees) via the two-stage rotation. During the rotation of the back plate, the back plate stops rotating at any position to serve as a support for the electronic device. On the other hand, since the back plate rotates by a large angle to expose the space under the back plate, it is convenient to replace or repair the inside components.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A hinge assembly adapted to an electronic device, the hinge assembly comprising: a fixing member fixed to a casing of the electronic device and including a side plate and two fixing plates, wherein the two fixing plates extend along a direction from two end portions of the side plate, respectively, and a curved guide rail is formed at the side plate; a sliding shaft slidably configured to the curved guide rail of the side plate; a connecting member, wherein the sliding shaft passes through one end of the connecting member; a rotating shaft fixed to a back plate of the electronic device and passing through another end of the connecting member; and a rotating member, wherein the rotating shaft passes through the rotating member; wherein when the sliding shaft is located at a first position and a force applies on the rotating member, the sliding shaft moves from the first position to a second position along the curved guide rail, when the sliding shaft is located at the second position along the curved guide rail and the force applies on the rotating member continuously, the rotating member rotates around the rotating shaft; wherein the sliding shaft includes a first torsion device, and the rotating shaft includes a second torsion device; and wherein the first torsion device and the second torsion device include at least one elastic sheet and at least one nut, respectively.

2. The hinge assembly according to claim 1, further comprising a sliding member and a stopping sheet, wherein the sliding member is slidably configured to the connecting member, the sliding shaft passes through the stopping sheet and the stopping sheet selectively abuts against the sliding member.

3. The hinge assembly according to claim 2, wherein the sliding member includes a positioning protrusion, a positioning recess is formed at an end of the rotating shaft, when the stopping sheet abuts against the sliding member, the positioning protrusion is restricted at the positioning recess.

4. The hinge assembly according to claim 1, wherein the side plate further includes a guiding member, the sliding shaft includes a guiding recess recessed at an end portion, and the guiding recess abuts against the guiding member.

5. The hinge assembly according to claim 4, wherein the shape of the guiding recess corresponds to the shape of the curved guide rail.

6. The hinge assembly according to claim 1, wherein the side plate further includes a recess, the recess is located above the curved guide rail, the sliding shaft further includes a positioning member, and the positioning member is slidably configured within the recess.

7. The hinge assembly according to claim 6, wherein the shape of the recess corresponds to the shape of the curved guide rail.

8. The hinge assembly according to claim 1, wherein the hinge assembly further comprises a stopping member, the rotating shaft passes through the stopping member, the rotating member includes a protrusion, and the protrusion selectively abuts against the stopping member.

9. An electronic device comprising: a casing; a back plate; a hinge assembly, including: a fixing member fixed to a casing of the electronic device and including a side plate and two fixing plates, wherein the two fixing plates extend along a direction from two end portions of the side plate, respectively, and a curved guide rail is formed at the side plate; a sliding shaft slidably configured to the curved guide rail of the side plate; a connecting member, wherein the sliding shaft passes through one end of the connecting member; a rotating shaft fixed to a back plate of the electronic device and passing through another end of the connecting member; and a rotating member, wherein the rotating shaft passes through the rotating member; wherein when the sliding shaft is located at a first position and a force applies on the rotating member, the sliding shaft moves from the first position to a second position along the curved guide rail, when the sliding shaft is located at the second position along the curved guide rail and the force applies on the rotating member continuously, the rotating member rotates around the rotating shaft; wherein the sliding shaft includes a first torsion device, and the rotating shaft includes a second torsion device; and wherein the first torsion device and the second torsion device include at least one elastic sheet and at least one nut, respectively.

* * * * *